US012347206B2

(12) United States Patent
Song et al.

(10) Patent No.: US 12,347,206 B2
(45) Date of Patent: Jul. 1, 2025

(54) UNMANNED COMBAT VEHICLE AND TARGET DETECTION METHOD THEREOF

(71) Applicant: HANWHA AEROSPACE CO., LTD., Changwon-si (KR)

(72) Inventors: Jin Mo Song, Changwon-si (KR); Young Jin Seo, Changwon-si (KR); Jae Chan Park, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 405 days.

(21) Appl. No.: 17/837,635

(22) Filed: Jun. 10, 2022

(65) Prior Publication Data

US 2023/0215185 A1    Jul. 6, 2023

(30) Foreign Application Priority Data

Jan. 3, 2022    (KR) .................... 10-2022-0000376

(51) Int. Cl.
*G06V 20/58*    (2022.01)
*G06V 10/24*    (2022.01)
*G06V 10/25*    (2022.01)

(52) U.S. Cl.
CPC .............. *G06V 20/58* (2022.01); *G06V 10/24* (2022.01); *G06V 10/25* (2022.01); *G06V 2201/07* (2022.01)

(58) Field of Classification Search
CPC ........ G06V 20/58; G06V 10/25; G06V 10/24; G06V 2201/07
USPC ....................................................... 382/103
See application file for complete search history.

(56) References Cited

U.S. PATENT DOCUMENTS

| | | | |
|---|---|---|---|
| 10,095,942 B2 * | 10/2018 | Mentese | G06V 10/25 |
| 10,816,306 B2 | 10/2020 | Lyren | |
| 11,093,763 B2 * | 8/2021 | Takemura | H04N 13/239 |
| 11,126,865 B2 * | 9/2021 | Shashua | G06V 20/58 |
| 11,676,287 B2 * | 6/2023 | Song | F41A 27/28 |
| | | | 382/103 |
| 2015/0227806 A1 * | 8/2015 | Oami | G06V 20/54 |
| | | | 348/222.1 |
| 2020/0125863 A1 * | 4/2020 | Shashua | G06V 20/58 |
| 2020/0175326 A1 * | 6/2020 | Shen | G05D 1/2465 |
| 2020/0311854 A1 * | 10/2020 | Toda | B25J 9/1671 |
| 2021/0092277 A1 * | 3/2021 | Kim | G08G 5/22 |
| 2021/0116943 A1 * | 4/2021 | Wang | G06V 20/10 |
| 2021/0118172 A1 * | 4/2021 | Zhou | G05D 1/12 |
| 2021/0174117 A1 * | 6/2021 | Hever | H04N 7/181 |
| 2021/0183040 A1 * | 6/2021 | Liu | H04N 17/002 |
| 2021/0188261 A1 * | 6/2021 | Song | B60W 40/105 |
| 2021/0302128 A1 * | 9/2021 | Ferren | F41A 33/00 |

(Continued)

FOREIGN PATENT DOCUMENTS

| | | |
|---|---|---|
| KR | 10-1288388 B1 | 7/2013 |
| KR | 10-1811717 B1 | 1/2018 |

(Continued)

*Primary Examiner* — William D Titcomb
(74) *Attorney, Agent, or Firm* — Sughrue Mion, PLLC

(57) ABSTRACT

An unmanned vehicle includes: at least one camera configured to obtain an image; and an image processor configured to: detect an object from the image; set a region of interest at the object in the image; and detect a target within the region of interest by detecting a change in pixel values from the region of interest, wherein the target is positioned behind the object.

20 Claims, 15 Drawing Sheets

(56) References Cited

U.S. PATENT DOCUMENTS

2022/0122271 A1\*  4/2022  Song ...................... G06V 20/58
2022/0150417 A1\*  5/2022  Bramlett ................... G06T 7/70
2022/0392111 A1\* 12/2022  Sztuk ..................... G06V 20/20

FOREIGN PATENT DOCUMENTS

KR            10-2290878 B1    8/2021
KR     10-2021-0115493 A       9/2021

\* cited by examiner

United States Patent US 12,347,206 B2

UNMANNED COMBAT VEHICLE AND TARGET DETECTION METHOD THEREOF

CROSS-REFERENCE TO RELATED APPLICATION

This application is based on and claims priority from Korean Patent Application No. 10-2022-0000376, filed on Jan. 3, 2022, in the Korean Intellectual Property Office, the disclosure of which is incorporated herein in its entirety by reference.

BACKGROUND

1. Field

The disclosure relates to an unmanned combat vehicle and a target detection method thereof.

2. Description of the Related Art

To actively cope with technical developments and changes in future battlefield environments, next-generation combat vehicles operated unmanned are being developed and operated, and products for prompt and effective response to various future threats, with improvement in viability and combat efficiency of combatants, have been developed in place of manned combat vehicles.

SUMMARY

Embodiments of the disclosure provide an unmanned vehicle and a target detection method, by which concealed or occluded targets may be rapidly detected in wild land/rough land environments.

Various aspects will be set forth in part in the description which follows and, in part, will be apparent from the description, or may be learned by practice of the presented embodiments of the disclosure.

According to embodiments, there is provided a target detection method performed by an unmanned vehicle including a first camera and a second camera is provided. The method may include: detecting an object from a first image obtained by the first camera, based on a first field of view; setting a region of interest at the object in the first image; detecting a target within the region of interest; and, detecting target information from a second image obtained from the second camera pointing to the region of interest from which the target is detected, based on a second field of view that is smaller than the first field of view.

According to embodiments, there is provided an unmanned vehicle which may include: a first camera configured to obtain a first image using a first field of view; a second camera configured to obtain a second image using a second field of view that is smaller than the first field of view; and an image processor configured to detect an object from the first image, set a region of interest at the object in the first image, detect a target within the region of interest, and detect target information from the second image obtained by the second camera pointing to the region of interest from which the target is detected.

According to embodiments, there is provided an unmanned vehicle which may include: at least one camera configured to obtain an image; and an image processor configured to: detect an object from the image; set a region of interest at the object in the image; and detect a target within the region of interest by detecting a change in pixel values from the region of interest, wherein the target is positioned behind the object.

BRIEF DESCRIPTION OF DRAWINGS

The above and other aspects, features, and advantages of the embodiments of the disclosure will be more apparent from the following description taken in conjunction with the accompanying drawings, in which.

DETAILED DESCRIPTION

Figure 1:
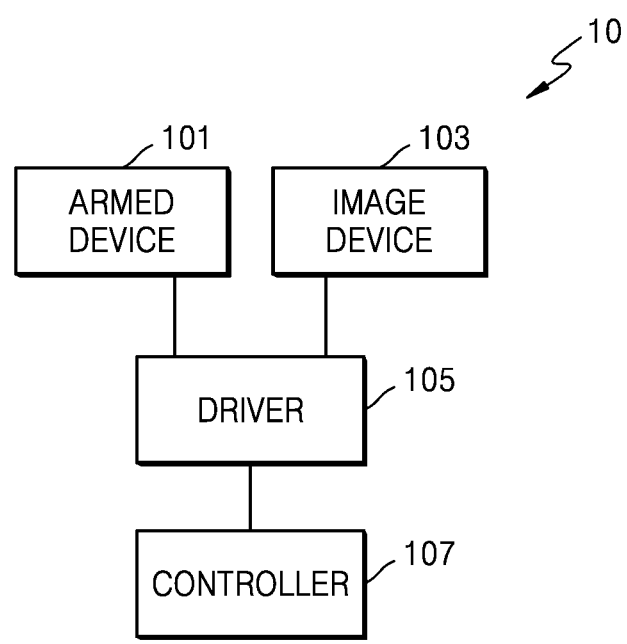
FIG. 1 is a schematic block diagram of an unmanned combat vehicle according to an embodiment.

Reference will now be made in detail to embodiments, examples of which are illustrated in the accompanying drawings, wherein like reference numerals refer to like elements throughout. All embodiments provided herein are example embodiments, and thus, may have different forms and should not be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

The following descriptions merely provide the principle of the disclosure. Therefore, although not clearly described or shown in the present specification, one of ordinary skilled in the art may implement the principle of the disclosure, and may devise various devices included in the concept and scope of the disclosure. In addition, it will be understood that all conditional terms and embodiments listed in the present specification are clearly intended for purposes only to ensure that the concept of the disclosure is understood, and are not limited to the embodiments and states that are specifically listed in the specification. In addition, all kinds of detailed descriptions for enumerating certain embodiments, as well as the principle, the point of view, and embodiments of the disclosure, should be understood as intended to include structural and functional equivalents thereof. Furthermore, it will be understood that the equivalents include equivalents to be developed in the future, as well as the well-known equivalents, that is, all kinds of devices devised to perform same functions regardless of structures thereof.

Accordingly, functions of the various devices shown in the drawings including function blocks represented as a processor or similar concepts thereof may be provided with the use of hardware having the ability to execute software in relation to proper software, as well as dedicated hardware. When provided by a processor, the functions may be provided by a single dedicated processor, a single shared processor, or a plurality of individual processors, and some of the processors may be shared. In addition, the use of terms represented as "processor", "control" or concepts similar thereto are not interpreted by exclusively citing hardware having the ability to execute the software, and will be understood as implicitly and non-limitedly including digital signal processor (DSP) hardware, ROM, RAM, and non-volatile memory for storing the software. Other hardware of common and general knowledge may also be included.

Purposes, features, and advantages effects described above will be more clearly understood through the following detailed description in conjunction with the accompanying drawings. In the description, certain detailed explanations of the related art are omitted when it is deemed that they may unnecessarily obscure the essence of the disclosure.

When a portion "includes" an element, another element may be further included, rather than excluding the existence of the other element, unless otherwise described.

When a certain embodiment may be implemented differently, a specific data processing order may be performed differently from the described order. For example, two consecutively described processes may be performed substantially at the same time or performed in an order opposite to the described order.

Hereinafter, the disclosure according to embodiments will be described in detail with reference to the accompanying drawings.

FIG. 1 is a schematic block diagram of an unmanned combat vehicle according to an embodiment.

An unmanned combat vehicle 10 according to an embodiment may include a mobile vehicle operated in a land environment, for example, a military environment, such as a unpaved road, a rough road, or a wild road. The unmanned combat vehicle 10 is installed with a monitoring sensor, by which a tendency or situation of an enemy may be monitored while moving unmanned within a battlefield. The unmanned combat vehicle may find occluded enemies without human interference when reconnoitering or breaking into an enemy camp, recognize a most threatening situation to determine a priority of a target, and may deliver the priority of the target to an operator. When the operator designates (selects) the most threatening target, the unmanned combat vehicle 10 may attack or suppress the designated target.

When carrying out operations, such as breaking into an ambushed terrain, it is difficult to find a target occluded by terrain materials, and particularly, when the target is completely occluded, there may be situations that a monitoring reconnaissance camera attached to the unmanned combat vehicle may not find the target. Although methods of finding occluded targets by using a transmission sensor or a drone have been devised, communication devices for communication with an expensive sensor or drone may be additionally required.

The unmanned combat vehicle 10 according to an embodiment may find the occluded target by only using a reconnaissance camera, identify the situation, and may provide a target order according to threat to the operator of a remote control center. The unmanned combat vehicle 10 may perform a long range communication with a command-and-control server of the remote control center by using mobile communication, and the command-and-control server may store, reserve and/or manage sensor data, power consumption data, and/or driving data of the unmanned combat vehicle 10 based on a big database (DB) system.

The unmanned combat vehicle 10 according to an embodiment may find a threat target by detecting, recognizing, and/or identifying an object by using artificial intelligence (AI)-based technology. The unmanned combat vehicle 10 may identify a position of a target in an image acquired by an onboard image sensor, and automatically control an armed device such that a center of the target matches a center of a firearm, and in this case, a most threatening target may be first aimed at. The operator may monitor situations remotely or from an outside of the unmanned combat vehicle 10 (for example, a remote control center), and when the target being aimed at is found to be a threat target, the operator may command the unmanned combat vehicle 10 to shoot to suppress the enemy. When the operator selects another target other than the target being aimed at from among targets displayed on a monitoring screen, the unmanned combat vehicle 10 may automatically aim at the target selected by the operator and stand-by for a shoot command.

Referring to FIG. 1, the unmanned combat vehicle 10 may include an armed device 101, an image device 103, a driver 105, and a controller 107.

The armed device 101 may include a firearm. The armed device 101 may further include a mounting mount, a triggering solenoid, and an ammunition supply device. The firearm may be mounted on the mounting mount, receive ammunition from the ammunition supply device, and may be triggered by the triggering solenoid to shoot an object or a target.

In the specification, an object means an object to be shot in an image obtained by the image device 103. In addition, the target indicates an object to be shot from among the objects. That is, the object includes the target, and an object selected as a target among the objects is the object to be shot.

The image device 103 may include at least one camera. The at least one camera may include a daytime camera and a night camera. The daytime camera and night camera may be coupled to a supporting member, and as the supporting member may rotate in a horizontal direction and a vertical direction, the daytime camera and the night camera may simultaneously rotate in a same direction angle and change the posture up, down, left, and right. Accordingly, in the embodiments herein, the image device 103 may be combined with the camera, and for example, the posture of the image device 103 may indicate a posture of the camera.

The daytime camera may be generally operated in daytime occasions to capture objects. However, the daytime camera may also be operated in night occasions. That is, under control of the controller 107, the daytime camera may be operated in night occasions as well as daytime occasions. In an embodiment, the daytime camera may include an electro-optical (EO) camera.

The night camera may be generally operated in nighttime occasions to capture objects. However, the night camera may also be operated in daytime occasions. That is, under control of the controller 107, the night camera may be operated in daytime occasions as well as night occasions. In an embodiment, the night camera may include an infrared ray (IR) camera.

The image device 103 may further include a wide-angle camera. A field of view (FOV) (a first FOV) of the wide-angle camera may be greater than an FOV (a second FOV) of the daytime camera and night camera. The wide-angle camera may include a front-fixed camera, and the daytime camera and night camera may include a pan-tilt-zoom (PTZ) camera. The PTZ camera may also be a fixed camera performing PTZ operations.

In an embodiment, when entering a battlefield, the unmanned combat vehicle 10 may monitor a wide region by using a wide-angle camera to detect an enemy, and when the enemy is detected, the unmanned combat vehicle 10 may intensively monitor the enemy by using the daytime camera and/or the night camera.

The driver 105 may include a motor, and may adjust positions and directions of the cameras and the firearm. The driver 105 may include a camera driver and a firearm driver.

The camera driver may drive at least one of the cameras and adjust a distance between the camera and the firearm, to thereby adjust a capture direction of the camera and a shooting direction of the firearm to be parallel to or cross with each other to perform zero-point adjustment or calibration.

The firearm driver may include a pitch driver and a rotation driver. The pitch driver drives the firearm up and down to shoot the target in an up-and-down direction. Here, the up-and-down direction indicates an up-and-down direction of a position to which a muzzle of the firearm points. The rotation driver drives the firearm to the left or right to shoot the target in a left or right direction. Here, the left or right direction indicates a left or right direction of a position to which the muzzle of the firearm points.

The controller 107 may receive a control signal from a remote control system and/or the image device 103, and may control the driver 105 in response to the control signal to control the armed device 101 and the image device 103. When the control signal is a triggering signal, the controller 107 may control the triggering solenoid for the firearm to perform shooting. When the control signal is a firearm manipulating signal, the controller 107 may control the pitch driver and/or the rotation driver of the firearm driver such that the firearm moves in a certain direction from among up, down, left, and right directions. When the control signal is a camera operation signal, the controller 107 may control the camera driver such that at least one of the cameras moves in a certain direction from among up, down, left, and right directions.

Figure 2:
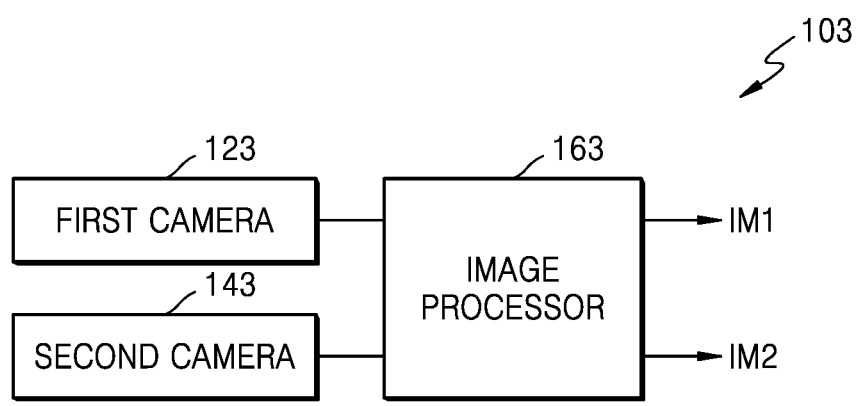
FIG. 2 is a schematic block diagram of an image device shown in FIG. 1, according to an embodiment.
Figure 3:
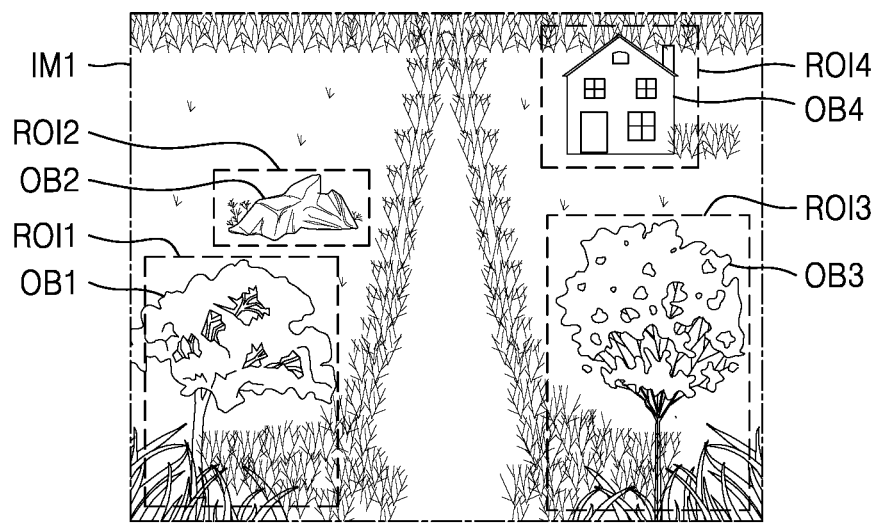
FIGS. 3 and 4 are diagrams for describing detecting an occluding object and setting an interest region, according to an embodiment.
Figure 4:
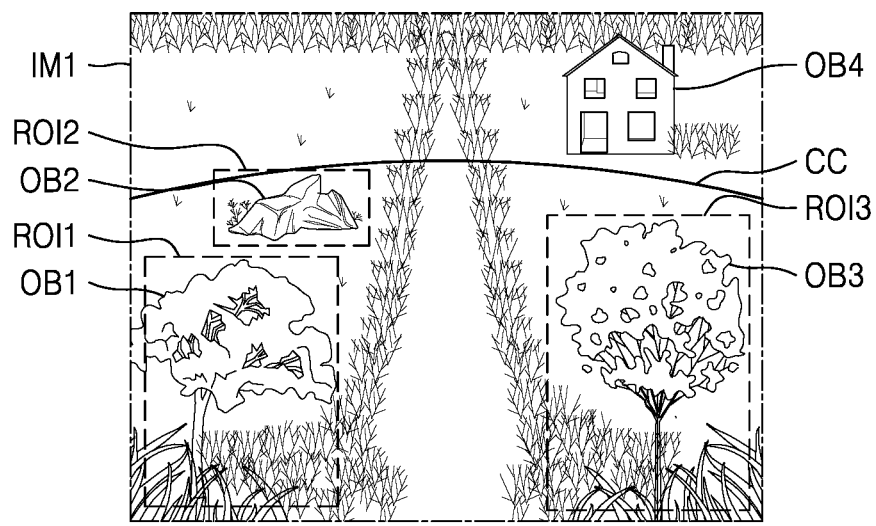
Figure 5:
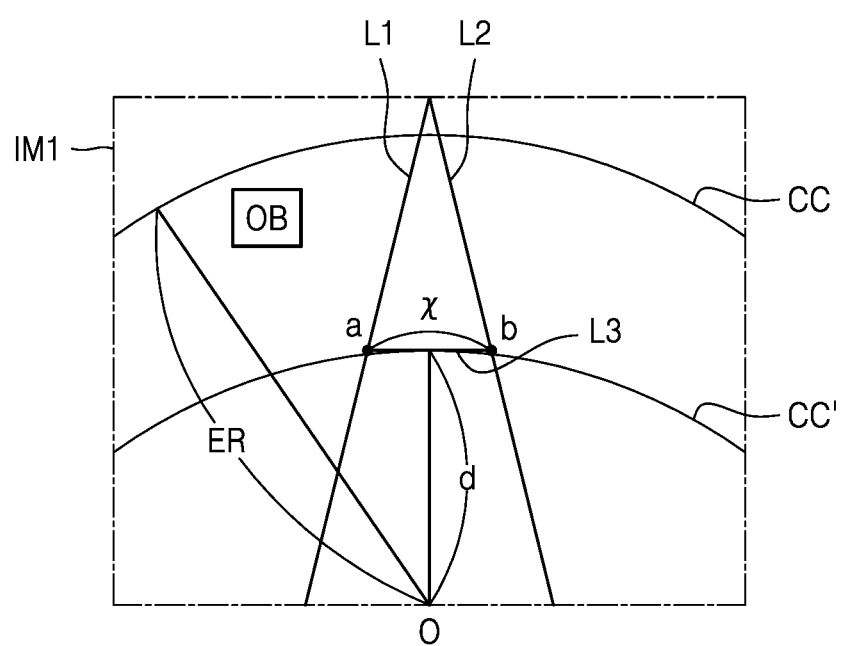
FIG. 5 is a diagram for describing a method of detecting an occluding object within an effective range by using a road, according to an embodiment.
Figure 6:
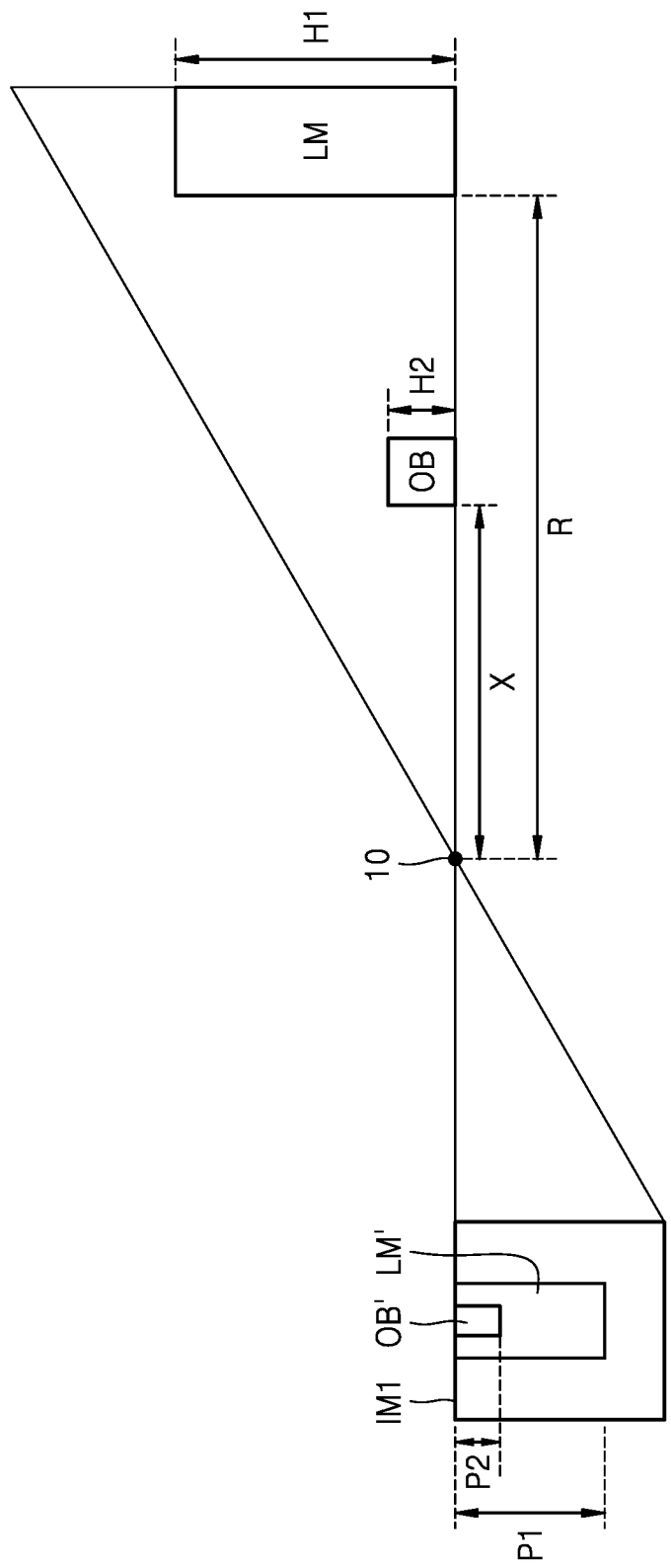
FIG. 6 is a diagram for describing a method of detecting an occluding object within an effective range by using a landmark, according to an embodiment.
Figure 7A:
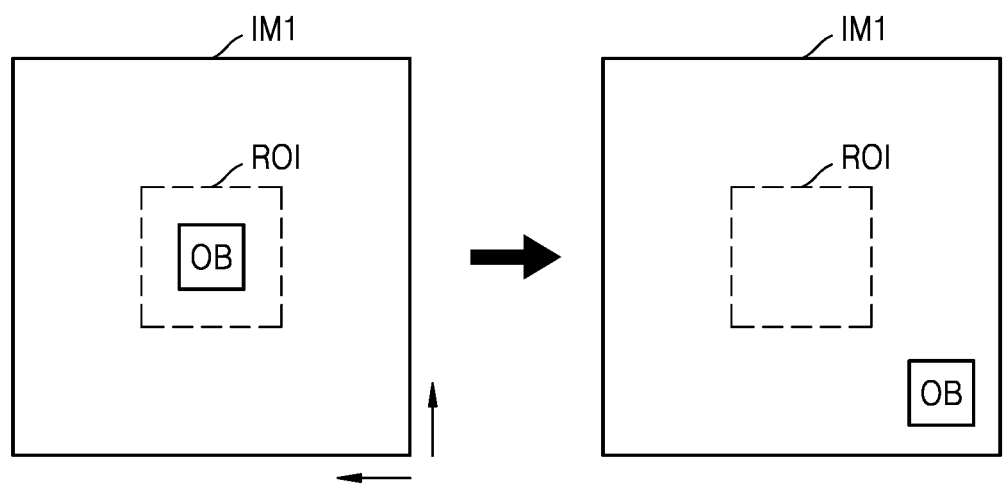
FIGS. 7A to 7C are diagrams for describing a method of calibrating a position of a region of interest, according to an embodiment.
Figure 7B:
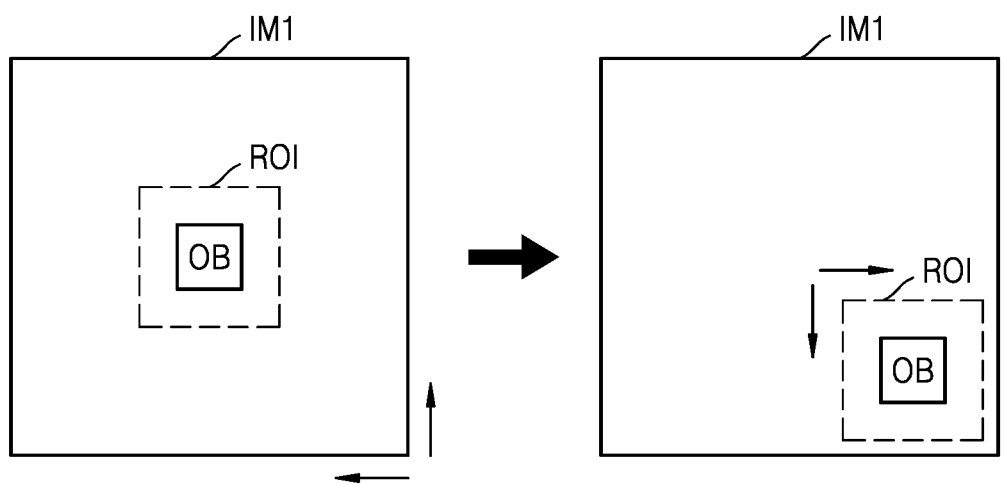
Figure 7C:
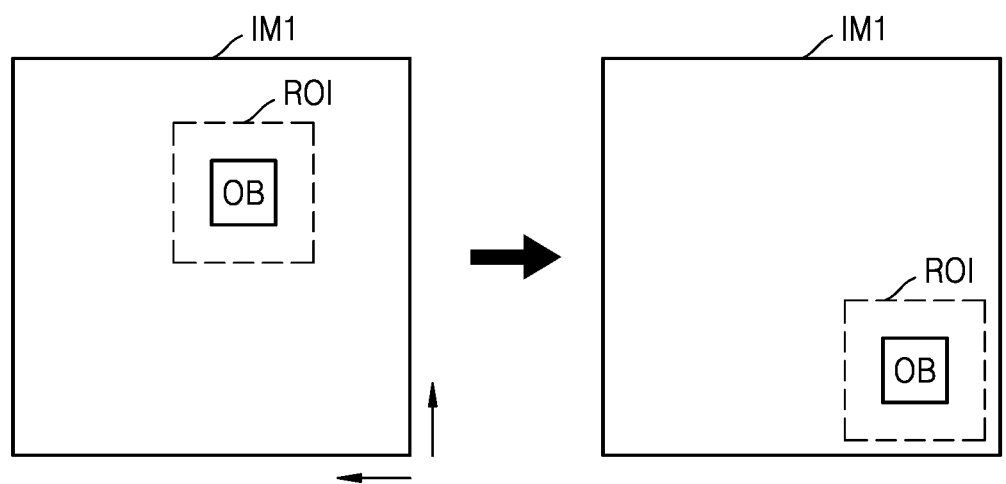
Figure 8:
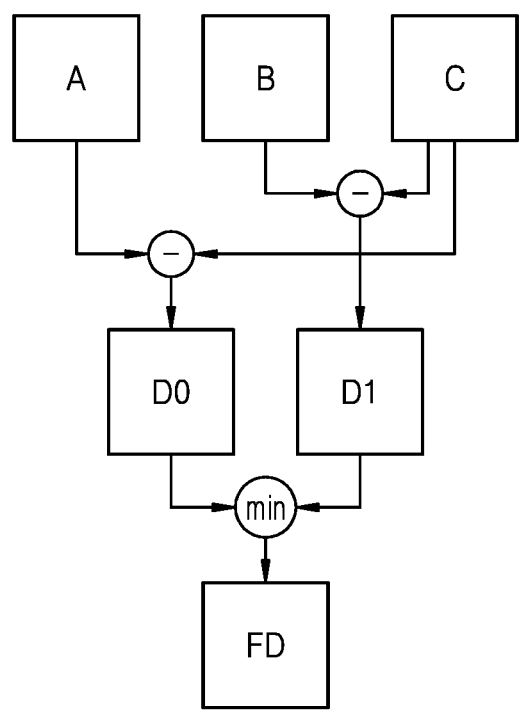
FIGS. 8 and 9 are diagrams for describing a method of detecting a target, according to an embodiment.
Figure 9:
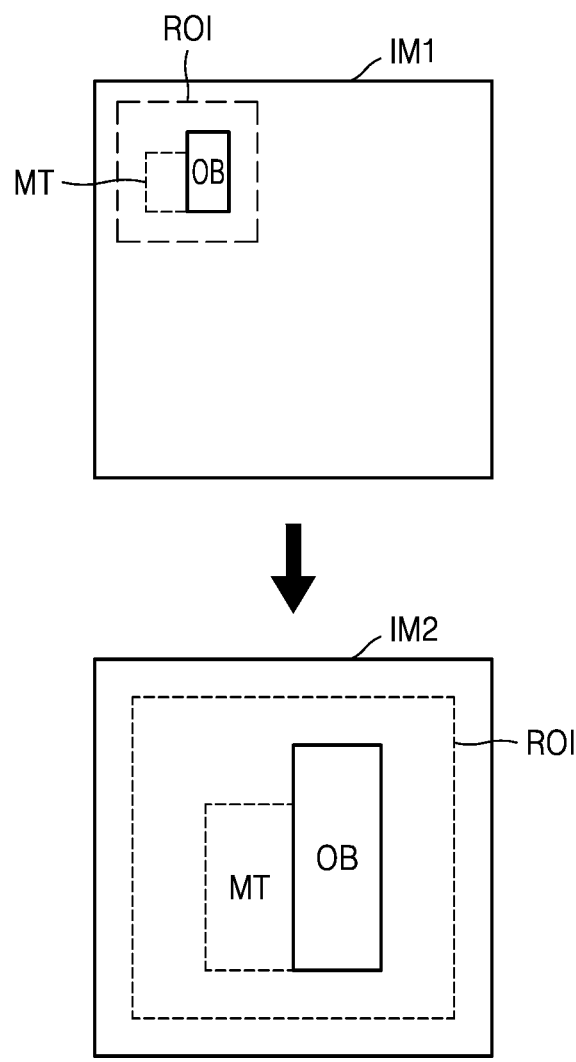
Figure 10:
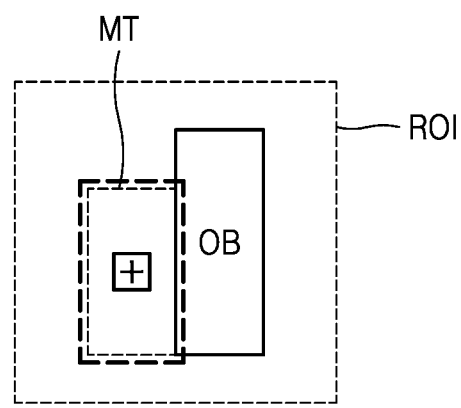
FIGS. 10 and 11 are diagrams for describing shooting a target, according to an embodiment.
Figure 11:
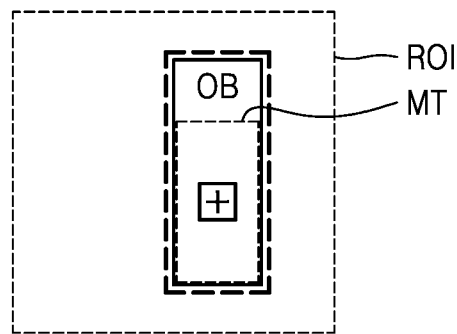
Figure 12:
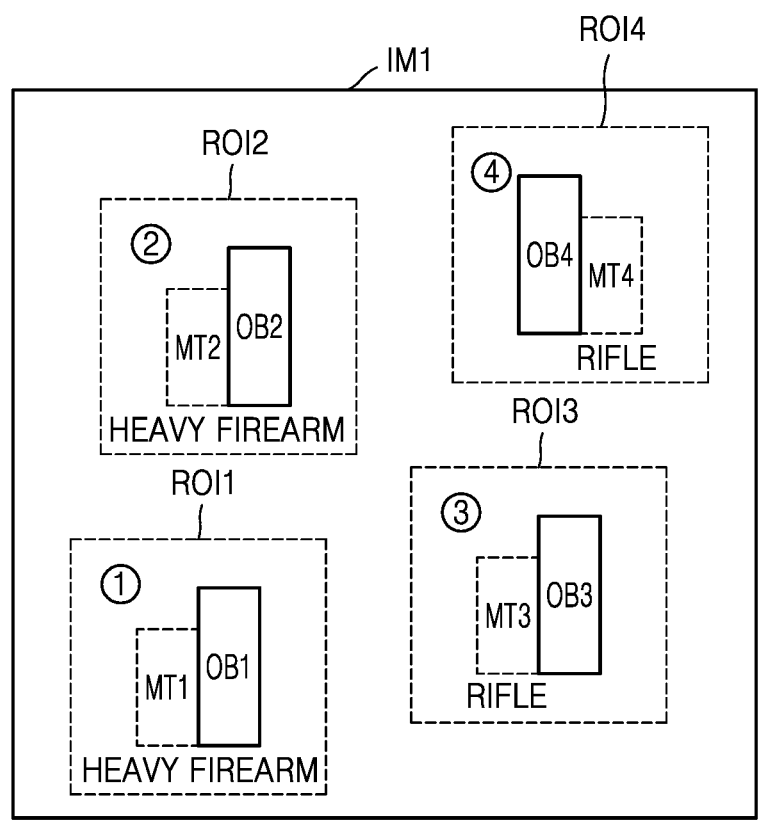
FIG. 12 is a diagram of an image provided to an operator by an unmanned combat vehicle according to an embodiment.

FIG. 2 is a schematic block diagram of the image device shown in FIG. 1, according to an embodiment. FIGS. 3 and 4 are diagrams for describing detecting an occluding object and setting a region of interest, according to an embodiment. FIG. 5 is a diagram for describing a method of detecting an occluding object within an effective range by using a road, according to an embodiment. FIG. 6 is a diagram for describing a method of detecting an occluding object within an effective range by using a landmark, according to an embodiment. FIGS. 7A to 7C are diagrams for describing a method of calibrating a position of a region of interest, according to an embodiment. FIGS. 8 and 9 are diagrams for describing a method of detecting a target, according to an embodiment. FIGS. 10 and 11 are diagrams for describing shooting a target, according to an embodiment. FIG. 12 is a diagram of an image provided to an operator by the unmanned combat vehicle according to an embodiment.

Referring to FIG. 2, the image device 103 may include a first camera 123, a second camera 143, and an image processor 163. The first camera 123 may be or include the wide-angle camera having the first FOV, and the second camera 143 may be or include the daytime camera and/or the night camera having the second FOV, as described above in reference to FIG. 1. The image processor 163 may include analog and/or digital circuits such as logic gates, integrated circuits, microprocessors, microcontrollers, memory circuits, passive electronic components, active electronic components, optical components, hardwired circuits, or the like, and may be driven by firmware and software configured to perform a plurality functions or operations describe herein.

In an embodiment, the image processor 163 may analyze an image (a first image) obtained by the first camera 123, detect at least one occluding object from the first image, and set a region of interest for the occluding object. The region of interest may include a certain region including the occluding object and a periphery thereof. The occluding object, which may be a fixed obstacle, such as bush, tree, rock, building, and the like, may include an object behind which another object may hide itself. The occluding object may also be a moving object such as human being, animal or vehicle.

For example, as shown in FIG. 3, the first camera 123 may generate the first image IM1 by capturing the front of the unmanned combat vehicle 10 by using the first FOV. The image processor 163 may detect a first occluding object OB1 to a fourth occluding object OB4 from the first image IM1. The image processor 163 may set a first region of interest RO1 to a fourth region of interest RO4 for the first occluding object OB1 to the fourth occluding object OB4, respectively.

In an embodiment, the image processor 163 may detect at least one occluding object from the first image obtained by the first camera 123, and may set a region of interest only for an occluding object within an effective range of the firearm from among the at least one occluding object. Here, the effective range may be a predetermined or fixed distance or distance range of a projectile of the firearm set by a manufacturer of the firearm.

For example, as shown in FIG. 4, the image processor 163 may detect the first occluding object OB1 to the third occluding object OB3 within a circle CC having the effective range as a radius from among the first occluding object OB1 to the fourth occluding object OB4 detected from the first image IM1, and may set the first region of interest RO11 to the third region of interest RO13 respectively including the first occluding object OB1 to the third occluding object OB3.

Detection of the occluding object by the image processor 163 may include recognition and identification with respect to the occluding object. For example, the image processor 163 may not only detect the occluding object but also obtain a type (bush, tree, rock, building, human being, animal, vehicle, and the like) of the occluding object that has been detected and information thereabout (for example, distance range, size, color, and the like). The image processor 163 may detect, recognize, and identify the occluding object on the basis of AI technology.

In an embodiment, the image processor 163 may detect the occluding object within the effective range by measuring a distance from the unmanned combat vehicle 10 to the occluding object (hereinafter, referred to as "the distance to the occluding object") by using a distance measuring device. In another embodiment, the image processor 163 may quickly detect the occluding object within the effective range by using geographic information system (GIS) information and global positioning system (GPS) information that are previously known. For example, the image processor 163 may detect the occluding object within the effective range by using GIS information about a road or a landmark.

In an embodiment, the image processor 163 may detect the occluding object within the effective range by setting a circle having the effective range as a radius (hereinafter, referred to as "an effective range radius") in the first image IM1 by using the GIS information about the road.

Referring to FIG. 5, the image processor 163 may detect a pair of road lines L1 and L2 and may set a point a on one road line (for example, the road line L1) among the pair of road lines L1 and L2. The image processor 163 may detect the road lines L1 and L2 by using a line detection algorithm. The line detection algorithm may include a method of edge detection, Hough transformation, and the like. The image processor 163 may calculate a shortest distance from the point a to the road line L2, that is, a pixel length x of a straight line L3 connecting the point a on the road line L1 to a point b on the road line L2 facing the point a. The pixel length x may indicate the number of pixels between the point a and the point b. The image processor 163 may calculate an actual survey distance D corresponding to a radius d of a circle CC' contacting the straight line L3, according to Expression (1). The image processor 163 may calculate the actual survey distance D on the basis of a road width W, a pixel length P in a horizontal direction of the first image IM1, the pixel length x of the straight line L3, and an FOV f. The image processor 163 may set an effective range radius ER in the first image IM1 on the basis of the actual survey distance D for an arbitrary position in the first image IM1 and the effective range of the fire arm. A center O of a circle CC may be set as a center of a lowermost edge of the first image IM1.

$$D = \frac{W \times P}{2x \tan\left(\frac{f}{2}\right)} \quad (1)$$

The image processor 163 may set a region of interest (ROI) for an occluding object OB within the effective range radius ER.

In an embodiment, the image processor 163 may detect the occluding object OB within the effective range by calculating the distance to the occluding object by using GIS information about a landmark. The landmark may include an identifiable background, such as a building, a mountain, and the like.

Referring to FIG. 6, the image processor 163 of the unmanned combat vehicle 10 may obtain, from the GIS information, an actual survey height H1 of a landmark LM (for example, mountain or building) in the front corresponding to a landmark LM' that is a background in the first image IM1 and a distance R between the unmanned combat vehicle 10 and the landmark LM. The image processor 163 may calculate a pixel length P1 of the landmark LM' and the pixel length P2 of an occluding object OB' in the first image IM1. The image processor 163 may obtain a height H2 of an occluding object OB by using occluding object information that has been previously stored. The image processor 163 may calculate a distance X between the unmanned combat vehicle 10 and the occluding object OB according to Expression (2). For example, when the actual survey height H1 of the landmark is 100 m, the height H2 of the occluding object OB is 2 m, the distance R between the unmanned combat vehicle 10 and the landmark LM is 1000 m, the pixel length P1 of the landmark LM' is 400 pixel, and the pixel length P2 of the occluding object OB' is 40 pixel, the distance X between the unmanned combat vehicle 10 and the occluding object OB may be calculated as 5 m according to Expression (2).

$$\frac{P2}{P1} = \frac{H2}{H1} \times \frac{R}{X} \quad (2)$$

$$X = R\left(\frac{H2}{H1} \times \frac{P1}{P2}\right)$$

When the occluding object OB is detected, the image processor 163 may obtain information about the detected the occluding object within the effective range according to Expression (2), and when the occluding object OB is not detected, the image processor 163 may obtain information about the detected the occluding object within the effective range according to Expression (1). The image processor 163 may detect the occluding object OB by using AI.

The image processor 163 may set an ROI for the occluding object within the effective range, according to Expression (1) or Expression (2).

As the unmanned combat vehicle 10 is a mobile platform, movement such as vibration and/or rotation of at least one of the cameras installed in the unmanned combat vehicle 10 may occur due to disturbance, such as an uneven road surface and/or a shooting impact. Thus, a position of an occluding object in an image acquired by the unmanned combat vehicle 10 may be abruptly changed due to this unintended movement. Accordingly, an ROI for the occluding object may be displaced from the occluding object. FIG. 7A illustrates a case in which the camera moves in the +y direction and/or −x direction and the ROI is displaced from the occluding object OB. The image processor 163 according to embodiments of the disclosure may maintain the ROI at the occluding object by calibrating a position of the ROI in response to posture changes of the camera due to movement of the camera in the image.

In an embodiment, the image processor 163 may maintain the ROI at the occluding object by calculating an amount of pixel movement caused by the movement of the camera in the image to compensate for the position of the ROI that specifies the occluding object. FIG. 7B illustrates an example in which the ROI is maintained on the occluding object OB by compensating for an amount of pixel movement calculated when the camera moves in the +y direction and −x direction. Here, the pixel movement may indicate movement of pixels representing the occluding object in the image.

The amount of posture change of the camera is expressed as an amount of physical movement (e.g., rotation) of the camera, that is, an amount of change in a direction angle of the camera, and the amount of change in the direction angle of the camera may be converted into an amount of displacement of pixel units, that is, an amount of pixel movement. For example, in a time interval between a pair of images having a time difference therebetween (for example, a previous image and a current image), an amount of rotation in the horizontal direction, that is, an amount of change in a yaw angle, may correspond to an amount of pixel movement in the x direction of global movements between the pair of images. In the time interval between the pair of images, an amount of rotation of the camera in the vertical direction, that is, an amount of change in a pitch angle, may correspond to an amount of pixel movements in the y direction of global movements between the pair of images.

The image processor 163 may calculate the amount of pixel movement corresponding to an amount of posture change of the first camera 123, that is, Δm(x,y), according to a pinhole camera model and Expressions (3) and (4) below.

$$\Delta m(x) = \Delta \theta_m \times \frac{p_x}{f_x} \quad (3)$$

$$\Delta m(y) = \Delta \psi_m \times \frac{p_y}{f_y} \quad (4)$$

In Expressions (3) and (4), $\Delta\theta_m$ indicates the amount of change in the yaw angle measured during the time interval between the previous image and the current image, $\Delta\psi_m$ indicates the amount of change in the pitch angle measured during the time interval between the previous image and the current image, $P_x$ indicates a size of a yaw axis of the current image, $P_y$ indicates a size of a pitch axis of the current image, $f_x$ indicates an FOV of the yaw axis, and $f_y$ indicates an FOV of the pitch axis.

The image processor 163 may calibrate the position of the ROI while the movement of the unmanned combat vehicle 10 is paused, and even when the unmanned combat vehicle 10 is in move, the image processor 163 may calculate the amount of movement of a background object and compensate for the amount of movement of the background object to calibrate the position of the ROI. The image processor 163 may calculate the amount of movement of the background object by using the GPS information.

In an embodiment, the image processor 163 may maintain the ROI at the occluding object by using tracking information about the occluding object within the first image IM1. The image processor 163 may lock-on the occluding object by the object tracking method to track the occluding object and designate the ROI for the occluding object that has been tracked, to thereby strongly cope with the posture change due to movement of the camera. FIG. 7C illustrates an example in which the ROI is maintained at the occluding object OB even when the camera moves in the +y direction and the −x direction by locking-on the occluding object OB and subordinating the ROI to the occluding object OB.

In an embodiment, the image processor 163 may determine whether the occluding object that has been detected may be destroyable by the armed device 101, and when the occluding object may be destroyable, the image processor 163 may output, to the controller 107, control signals for operating and triggering the firearm. The unmanned combat vehicle 10 may control the armed device 101 in response to the control signals to point at and shoot the occluding object that may be destroyable. The image processor 163 may set an ROI for occluding objects other than an occluding object that has been destroyed. Even in this case, the image processor 163 may set an ROI only for the occluding object within the effective range from among the occluding objects other than the occluding object that has been destroyed.

The image processor 163 may detect movements of an object that has been occluded by an occluding object in the ROI. When the object such as an enemy is completely covered by the occluding object, it is difficult to find targets by using the camera mounted in the unmanned combat vehicle. The enemy may not attack the unmanned combat vehicle due to the sight covered by the occluding object, and therefore has to inevitably stay away from the occluding object for attack. Accordingly, in the embodiments of the disclosure, an occasion in which the enemy momentarily moves away from the occluding object for attack or movement to another occluding object may be detected by movements of the object.

The image processor 163 may detect movements of the object from the ROI, and may determine detection of movements of the object to be detection of a target. The image processor 163 may detect the movements of the object in the ROI by detecting changes in pixel values from the image or the ROI in the image. Here, the pixel values may include at least one of hue, chroma, lightness, intensity, saturation, etc. The image processor 163 may set a region of object movements, which is detected from the ROI, as a region MT surrounding the target (hereinafter, referred to as a "target region"). When a size of the region of the object movements detected within the ROI is equal to or greater than a threshold value, the image processor 163 may determine the region to be the target region.

In an embodiment, the image processor 163 may detect the object movements in the ROI by using a difference image method and/or a correlation tracking method. A difference image may include a difference image among a plurality of first images IM1 having a time difference or a difference image among ROIs of the plurality of first images IM1 having a time difference.

In an embodiment, the image processor 163 may detect a region of object movements from three images including a current image at a current time point and two past images at two past time points (short and long past time points). The two past images may include a first past image before the current image and a second past image before the first past image. For example, as shown in FIG. 8, the image processor 163 may generate a first difference image D1 between a current image C at a (t) time point and a past image B at a (t−x1) time point, and a second difference image D0 between the current image C and a past image A at a (t−x2) time point. When there is object movement, due to difference between a past position and a current position, two regions with changed pixel values may be detected from the first difference image D1 and the second difference image D0. A region of pixel value change of the current image C will be the same in the first difference image D1 and the second difference image D0. Therefore, the image processor 163 may produce a final difference image FD including a region in which a distance between centers of gravity of the regions of pixel value change between the first difference image D1 and the second difference image D0 has a minimum value, that is, a region of pixel value change overlapping in the first difference image D1 and the second difference image D0. The region of pixel value change of the final difference image FD may be determined to be the region of object movements of the current image C. Although the embodiment is described with reference to the difference images between the images, embodiments of the disclosure are not limited thereto, and the region of object movements may also be determined by using difference images between ROIs of the images.

In an embodiment, the image processor 163 may detect a region of object movement from a difference image between a current image at a current time point and a past image at a past time point. For example, the image processor 163 may detect, as the region of object movement, a region in which a pixel value is changed from a difference image between an ROI of the current image at a (t) time point and an ROI of the past image at a (t−x1) time point.

The image processor 163 may calculate similarity between the ROI of the current image C and an ROI template, and determine that there is object movement in the ROI when the similarity is less than a predetermined value. The similarity may be calculated based on pixel value changes. The template of the ROI may include an ROI in a past image. For example, a template used for correlation tracking of the current image C may include the ROI of the past image B at the (t−1) time point. The image processor 163 may update the template of the ROI to the ROI of the current image.

The image processor 163 may synthesize a result of detecting object movements by using the final difference image FD and a result of detecting object movements by using correlation tracking, to thereby detect the region of object movements. According to the difference image method, it is difficult to detect pixel value changes in the case of slow motions or movements in an optical axis direction. According to the correlation tracking method, it is difficult to detect pixel value changes due to similar background clutters. The image processor 163 may more accurately detect the object movements within the ROI by simultaneously using the difference image method and the correlation tracking method.

When the target is detected by detecting the object movements, the image processor 163 may output a control signal controlling PTZ to the controller 107 to control the second camera 143 to point to the ROI from which the target is detected (hereinafter, referred to as a target ROI). A zoom value may be appropriately set such that a boundary of the occluding object does not exceed a boundary of the image.

The second camera 143 may change a PTZ value in response to the control signal of the controller 107, and may obtain the second image IM2 by pointing to the target ROI. For example, as shown in FIG. 9, when the target is detected from the first image IM1, the second image IM2 may be generated. The second image IM2 is obtained by the second camera 143 zooming-in the ROI from which the target is detected. Accordingly, the occluding object OB and the target region MT may be approximately in the center of the second image IM2.

The image processor 163 may analyze the second image IM2 obtained by the second camera 143, and may recognize and identify a target from the second image IM2. The image processor 163 may use AI to identify the target and obtain target information.

The target information may include a type of the target, a type of a firearm of the target, a relative distance (for example, a relative distance between occluding objects), and the like. For example, the target information may include object identification information, such as friendly forces, an enemy, and civilians, a type of objects, such as a human being, a vehicle, an airplane, a drone, a tank, an armored car, and a self-propelled gun, a type of firearm of an object, for example, a pistol, a rifle, a machine gun, an anti-tank firearm, an anti-aircraft firearm, and a high-angle gun, a type of occluding objects, such as tree, rock, bush, and house, information regarding a distance from the target, and the like.

The image processor 163 may determine a target threat based on the target information. For example, when the target is holding a heavy firearm in a casualty radius, the target may be determined to be an extremely dangerous target that is highly threatening.

When the target is determined to be a threat target, the image processor 163 may issue an alarm to the operator, and output a control signal to the controller 107 to control the armed device 10 to automatically aim and instantly shoot the target. For example, as shown in FIG. 10, the image processor 163 may issue an alarm to display a boundary of a target region MT of a threat target, and may place an aim point in the target region MT.

When the target hides again behind an occluding object OB, the image processor 163 may determine whether the occluding object OB may be destroyable by using the firearm currently in use, and when the occluding object OB may be destroyable, the image processor 163 may fix the firearm to the target region MT covered by the occluding object OB, that is, place the aim point at the occluding object OB, and then warn the operator to shoot the occluding object OB, as shown in FIG. 11. When it is impossible to destroy the occluding object OB, the second camera 143 and the firearm may stand-by in a state of placing the aim point at the occluding object OB until the target moves away again from the occluding object OB. The image processor 163 may automatically aim at the target by locking-on the target and tracking the target in the move.

When the unmanned combat vehicle 10 includes a plurality of different firearms, the operator may select a firearm capable of destroying the occluding object B according to a type of the occluding object and instruct pointing at and shooting the occluding object OB.

The image processor 163 may detect a target for each of a plurality of regions of interest, and may display target information and a target threat of the detected target in a first image IM1. For example, as shown in FIG. 12, the image processor 163 may display, in the first image IM1, a first ROI RO11 to a fourth RO14 respectively surrounding a first occluding object OB1 to a fourth occluding object OB4, target regions MT1 to MT4 respectively detected from the first ROI RO11 to the fourth ROI RO14, rankings of target threats (①) to ④), and the target information. Referring to FIG. 12, types of firearms, such as a rifle and a heavy firearm, are displayed in the first image IM1 as the target information. The image processor 163 may further display, in the first image IM1, alarm information, as shown in FIGS. 10 and 11. The image processor 163 may differently set one or more highlight colors to the target regions according to ranking of a target threat.

The remote control center may receive the first image IM1, the target information, and the target threat from the unmanned combat vehicle 10, and may display the first image IM1, the target information, and the target threat on a screen of a monitoring device.

Figure 13:
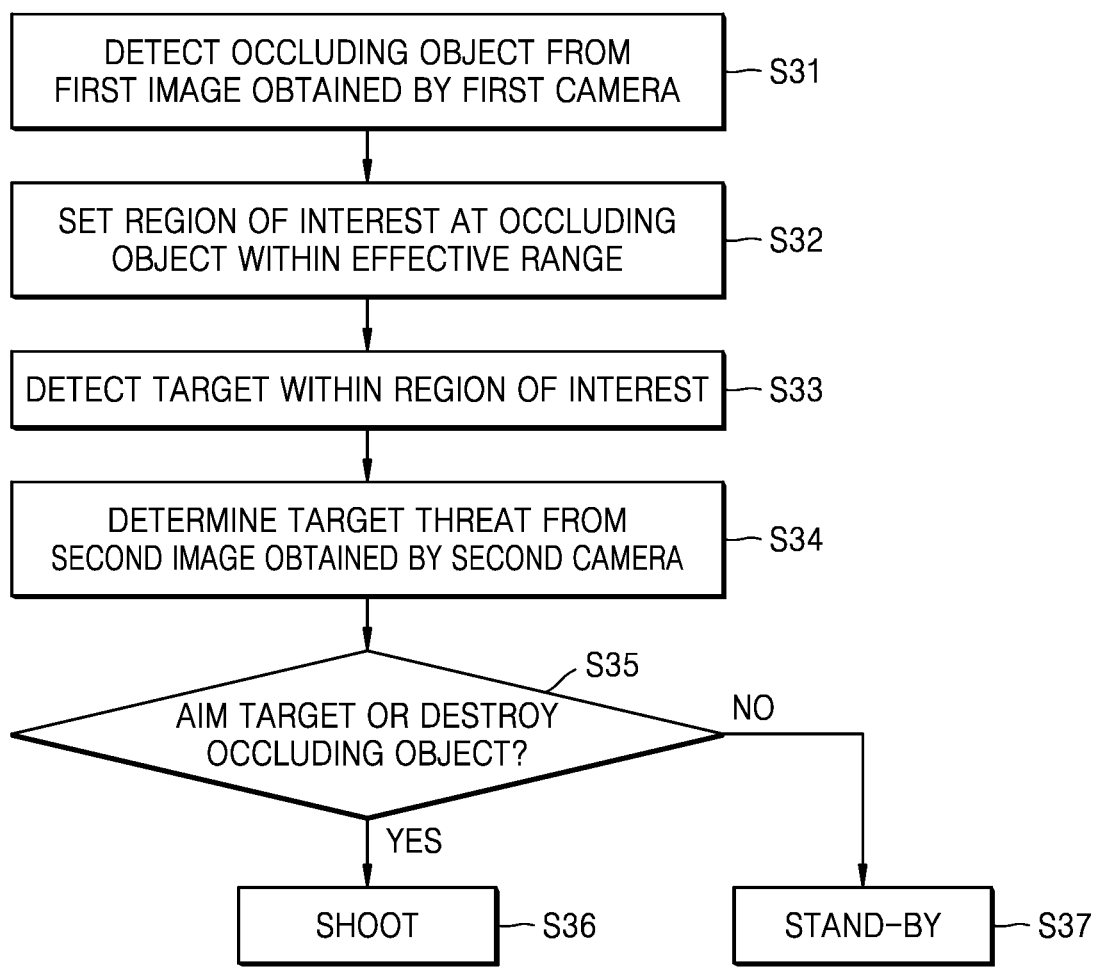
FIG. 13 is a schematic flowchart for describing a target detection method of an unmanned combat vehicle, according to an embodiment.

FIG. 13 is a schematic flowchart for describing a target detecting method performed by an unmanned combat vehicle, according to an embodiment of the disclosure. The unmanned combat vehicle described in the present embodiment corresponds to the unmanned combat vehicle described above in reference to FIGS. 1 to 12. Thus, detailed descriptions already given above will be omitted.

In S31, the unmanned combat vehicle 10 may detect at least one occluding object from the first image having the first FOV obtained by the first camera 123. The unmanned combat vehicle 10 may use AI to recognize and identify at least one detected occluding object from the first image.

The unmanned combat vehicle 10 may detect the occluding object within the effective range of the firearm from the first image by using at least one of a distance measuring device, GIS information, GPS information, and the like. In an embodiment, the unmanned combat vehicle 10 may detect the occluding object within the effective range by setting a circle having the effective range radius within the image by using the road information. In an embodiment, the unmanned combat vehicle 10 may detect the occluding object within the effective range by calculating an actual survey distance to the occluding object by using actual survey sizes (a height and a distance) of the landmark, an actual survey size (a height) of the occluding object, and a pixel length corresponding to the heights of the landmark and the occluding object in the image.

In S32, the unmanned combat vehicle 10 may set the ROI including the occluding object. The unmanned combat vehicle 10 may set an ROI only for the occluding object within the effective range from among at least one occluding object. In an embodiment, the unmanned combat vehicle 10 may maintain the ROI at the occluding object by compensating for the position of the ROI by calculating an amount of pixel movement due to movement of the first camera 123. In an embodiment, the unmanned combat vehicle 10 may maintain the ROI at the occluding object by using tracking information regarding the occluding object.

In S33, the unmanned combat vehicle 10 may detect the target that has been occluded by the occluding object within the ROI. The unmanned combat vehicle 10 may detect the target from the ROI by detecting object movements on the basis of pixel value changes around the occluding object within the ROI. The unmanned combat vehicle 10 may set the region of object movements, which has been detected, as the target region, and may control PTZ of the second camera such that the second camera points to the target. The second camera may obtain the second image by the second FOV that is smaller than the first FOV of the first camera. When a size of the region of movement that has been detected is equal to or greater than the threshold value, the unmanned combat vehicle 10 may set the region of object movements as the target region.

In S34, the unmanned combat vehicle 10 may detect the target information by identifying the target from the second image obtained by the second camera, and may determine a target threat on the basis of the target information. The target information may include a type of the target, a type of a firearm of the target, a relative distance, and the like. The unmanned combat vehicle 10 may identify the target by using AI technology.

In S35, the unmanned combat vehicle 10 may determine whether the occluding object may be destroyable according to aiming at the target threat or re-occluding of the target. In S36, the unmanned combat vehicle 10 may shoot the target when the target is the threat target or the occluding object may be destroyable. In S37, when the target is not the threat target or the occluding object is not destroyable, the unmanned combat vehicle 10 may have the second camera and the firearm stand-by.

The unmanned combat vehicle 10 may display, in the first image IM1, ranking of the target based on the target threat, the target information, an alarm for the threat target, and the like.

Combat vehicles in the related art are operated as manned with a human being in the vehicles, and particularly, as operations of reconnaissance and arming are performed outside the vehicles, the combat vehicles are vulnerable to foreign attacks. Especially, it is difficult to find occluded enemies while breaking into an ambush region or an enemy camp, and as aiming is performed from outside the combat vehicle, it is difficult to survive from intensive attacks from the enemy.

According to embodiments of the disclosure, an occasion in which the enemy temporarily moves away from an occluding object for attack or movement to another occluding object may be obtained as image information to recognize objects. According to embodiments of the disclosure, the objects may be recognized by connecting different kinds of cameras (for example, cameras respectively having different FOVs), and the threat target may be determined by collective determination about the type of the firearm of the target, the distance from the object, and the like. According to embodiments, the target is automatically aimed at when the target is determined to be a threat target, and shooting is instructed when the aiming matches or the target is destroyable by the firearm of the occluding object, and accordingly, combat may be efficiently carried out. In addition, according to embodiments of the disclosure, information about the object occluded by the occluding object may be identified and provided to a command-and-control system, and the operator may efficiently suppress the enemy by using the provided information.

In the embodiments described above, one image processor analyzes and processes images from the first camera and the second camera. However, according to other embodiments, an image processor configured to analyze and process the image from the first camera and an image processor configured to analyze and process the image from the second camera may be individually provided.

In the embodiments described above, different types of cameras, such as a wide-angle camera for detection and a PTZ camera for identification are used. However, in other embodiments, by using one camera, the occluding object and the target may be detected from the image obtained by a wide FOV, and the occluding object and the target may be identified from the image obtained in a zoom-in state. According to a distance between the camera and the target, the occluding object and the target may also be identified from the image obtained by the wide FOV.

In the embodiments described above, the occluding object is detected by image analysis using the cameras. However, in other embodiments, the unmanned combat vehicle 10 may further include a near-infrared sensor, a LiDAR sensor, a radar sensor, and may obtain information about the object by cooperation with a drone and the like.

The target detection method according to embodiments of the disclosure may be implemented as computer-readable code in a computer-readable recording medium. The computer-readable recording medium includes any type of recording devices storing data that may be read by a computer system. The computer-readable recording medium may include, for example, read-only memory (ROM), random access memory (RAM), a CD-ROM, a magnetic tape, a floppy disk, an optical data storage device, and the like. In addition, the computer-readable recording medium may also be distributed over network-coupled computer systems so that the computer-readable code is stored and executed in a distributive manner. Also, functional programs, code, and code segments for accomplishing the disclosure may be easily construed by programmers skilled in the art to which the disclosure pertains.

By the target detection method performed by the unmanned combat vehicle according to the embodiments of the disclosure, the occluded target in wild land/rough land environments may be rapidly detected.

Thus far, the target detection method has been described in reference to the embodiments applied to an unmanned combat vehicle. However, the same or similar target detection method may also be applied to different types of unmanned vehicle or system It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A target detection method performed by an unmanned vehicle comprising a first camera using a first field of view and a second camera using a second field of view that is smaller than the first field of view, the target detection method comprising:
    detecting an object from a first image obtained by the first camera, based on the first field of view;
    setting a region of interest at the object in the first image;
    detecting a target within the region of interest; and
    detecting target information from a second image obtained from the second camera pointing to the region of interest from which the target is detected, based on the second field of view that is smaller than the first field of view.

2. The target detection method of claim 1, wherein the detecting the object comprises detecting the object within a predetermined distance.

3. The target detection method of claim 2, wherein the object within the predetermined distance is detected based on geographic information system (GIS) information about a road or a landmark detected from the first image.

4. The target detection method of claim 1, further comprising calibrating a position of the region of interest in response to a change in orientation of the first camera relative to the unmanned aerial vehicle.

5. The target detection method of claim 4, wherein the calibrating the position of the region of interest comprises:
    calibrating the position of the region of interest by compensating for an amount of pixel movement which corresponds to an amount of the change in orientation of the first camera relative to the unmanned aerial vehicle.

6. The target detection method of claim 4, wherein the calibrating the position of the region of interest comprises:
    calibrating the region of interest by tracking the object according to an object tracking method and setting the region of interest at the object that is tracked.

7. The target detection method of claim 1, further comprising:
    determining whether the target is detected from the region of interest, based on a pixel value change around the object in the region of interest.

8. The target detection method of claim 1, further comprising displaying the target information on the first image.

9. The target detection method of claim 8, wherein the displaying the target information comprises:
    determining a characteristic of the target based on the target information and displaying information about the characteristic on the first image.

10. The target detection method of claim 1, further comprising:
    obtain tracking information of the region of interest corresponding to an object based on detected movements of the object;
    controlling an orientation of the second camera to point at the region of interest of the object based on the tracking information;
    calibrating a position of the region of interest in response to a change in orientation of the first camera relative to the unmanned aerial vehicle; and
    displaying the target information on the first image.

11. An unmanned vehicle comprising:
    a first camera configured to obtain a first image using a first field of view;
    a second camera configured to obtain a second image using a second field of view that is smaller than the first field of view; and
    an image processor configured to detect an object from the first image, set a region of interest at the object in the first image, detect a target within the region of interest, and detect target information from the second image obtained by the second camera pointing to the region of interest from which the target is detected.

12. The unmanned vehicle of claim 11, wherein the image processor is configured to detect, from the first image, the object within a predetermined distance.

13. The unmanned vehicle of claim 12, wherein the image processor is configured to detect the object within the predetermined distance based on geographic information system (GIS) information about a road or a landmark detected from the first image.

14. The unmanned vehicle of claim 11, wherein the image processor is configured to calibrate a position of the region of interest in response to a change in orientation of the first camera relative to the unmanned aerial vehicle.

15. The unmanned vehicle of claim 14, wherein the image processor is configured to calibrate the position of the region of interest by compensating for an amount of pixel movement which corresponds to an amount of the change in the orientation of the first camera relative to the unmanned aerial vehicle.

16. The unmanned vehicle of claim 11, wherein the image processor is configured to calibrate a position of the region of interest by tracking the object according to an object tracking method and setting the region of interest at the object that is tracked.

17. The unmanned vehicle of claim 11, wherein the image processor is configured to determine whether the target is detected from the region of interest based on a change in pixel values around the object in the region of interest.

18. The unmanned vehicle of claim 11, wherein the image processor is configured to display the target information on the first image.

19. An unmanned vehicle comprising:
    at least one camera configured to obtain an image; and
    an image processor configured to:
        detect an object from the image;
        set a region of interest at the object in the image;
        detect a target within the region of interest by detecting a change in pixel values from the region of interest; and
        adjust the region of interest in response to a change in orientation of the camera relative to the unmanned aerial vehicle,
    wherein the target is positioned behind the object.

20. The unmanned vehicle of claim 19, wherein the image processor is configured to change a position of the region of interest by compensating for an amount of pixel movement which corresponds a change in the orientation of the camera relative to the unmanned aerial vehicle.

* * * * *